United States Patent Office 3,403,767
Patented Oct. 1, 1968

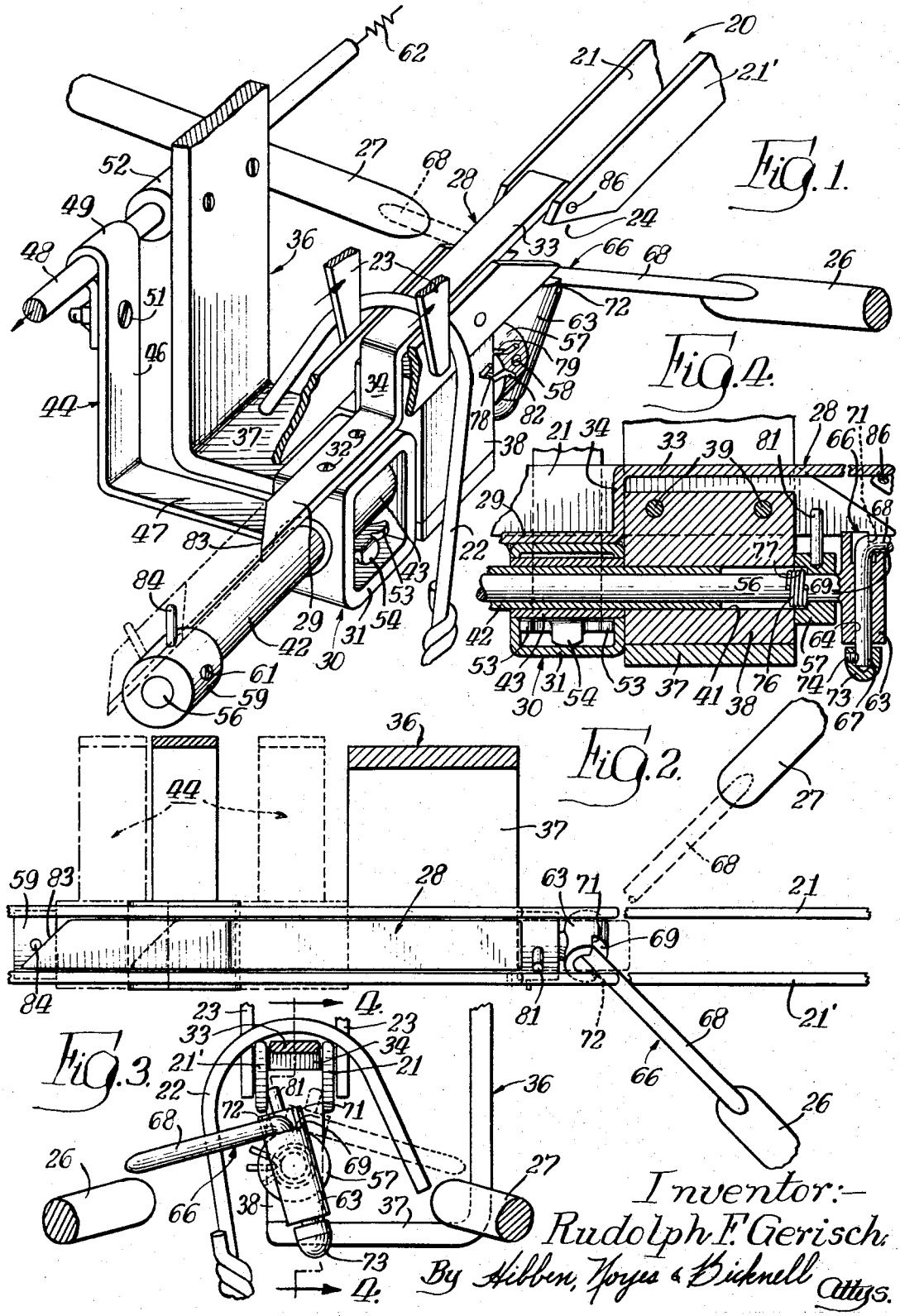

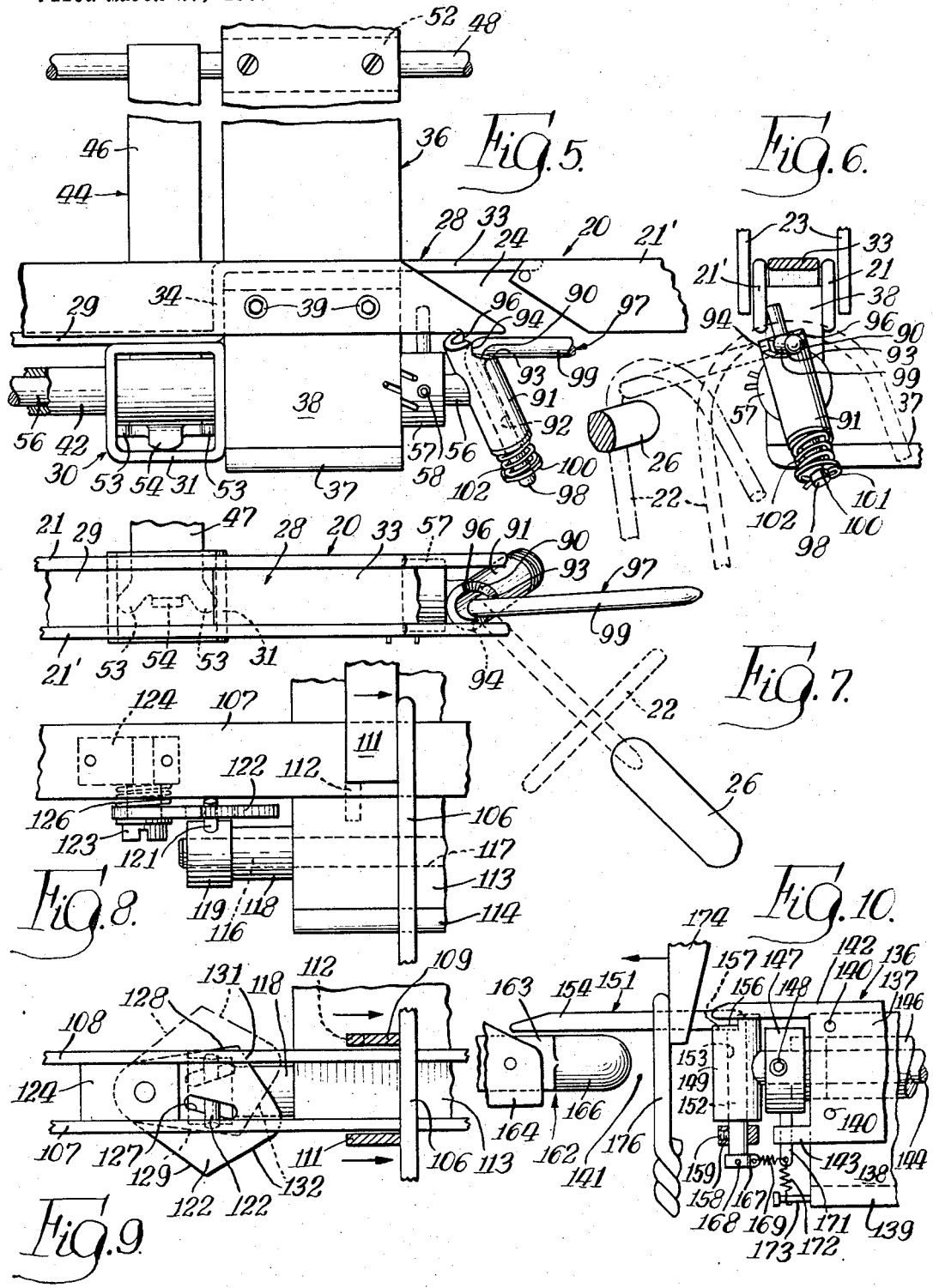

3,403,767
TWO-WAY SWITCH MEANS FOR
CONVEYOR SYSTEM
Rudolph F. Gerisch, 1317 Portsmouth Ave.,
Westchester, Ill. 60153
Filed Mar. 29, 1967, Ser. No. 626,851
11 Claims. (Cl. 198—20)

ABSTRACT OF THE DISCLOSURE

A two-way switch swingable in a pivot support between opposite bridging positions for selectively connecting a conveyor main rail with one or the other of a pair of branch rails, the pivot support for the switch also being tiltable by suitable actuating means to opposite positions corresponding to the discharge positions for the respective branch rails. Means may be provided for normally centering the switch in its pivot support so as to permit reverse operation of the conveyor. Means may also be provided for normally centering the pivot support relative to the main rail so that the switch can also function as a main rail switch.

---

This invention relates to an improved switch for use in a conveyor system, particularly a conveyor system wherein articles suspended on hooks or the like are moved along a main rail and discharged onto various branch rails extending outwardly from the main rail.

In dry cleaning plants, it is customary to convey garments on hangers from one location in the plant to another. Similarly, in laundry establishments conveyor systems are used to convey bags of presorted laundry through various stages in the plant. Although the invention will be described herein with particular reference to a conveying-sorting system of the type which might be used in a dry cleaning plant, it will be understood that the principles involved are applicable in many diverse industrial fields where conveying and sorting operations are required.

In my prior United States Patent No. 3,124,236, issued Mar. 10, 1964, I have described and claimed a novel gravity-actuated switch which permits articles suspended on clothes hangers or other hooks to be discharged from the main rail of the conveyor system to a laterally extending branch rail which may be located at one side or the other side of the main rail. By utilizing a freely pivotable switch element mounted on an inclined pivot axis at the juncture between the main rail and the branch rail, the switch is normally positioned by gravity in bridging relation between the main rail and the branch rail to permit discharge of hangers onto the branch rail, but the switch is freely swingable to open position by contact with a hanger moving along the main rail beyond the juncture. Once the hanger has moved beyond the juncture, the switch element returns to its normal bridging position by gravity actuation.

Although the switch means disclosed in my prior patent is an inexpensive and highly effective arrangement, nevertheless, it is limited in its operation to the discharge of articles to a branch rail located at only one side of the main rail. It would be desirable to have a selective two-way switch mechanism which would be capable of discharging an article at a discharge station on the main rail and selectively diverting the discharged article to one or the other of a pair of branch rails located at the discharge station but disposed at opposite sides of the main rail. As will readily be understood, such a two-way switch arrangement would greatly increase the flexibility and capacity of a given conveyor system.

Accordingly, a primary object of the present invention is to provide a novel and improved two-way switch arrangement for a conveyor system of the class described which is capable of selectively diverting an article from the main rail of the system to one or the other of a pair of branch rails located at a common discharge station.

An additional object of the invention is to provide a two-way selective switch arrangement of the aforementioned character which also accommodates reverse operation of the conveyor.

Still another object of the invention is to provide a novel switch means of the aforementioned character which functions not only as a bridging switch for selectively discharging articles to the branch rails but also as a main rail switch.

Other objects and advantages of the invention will be apparent from the subsequent detailed description taken in conjunction with the accompanying drawings, wherein:

FIG. 1 is a fragmentary perspective view of a conveyor system having a selective two-way switch means comprising one specific embodiment of the present invention;

FIG. 2 is a top plan view of the structure shown in FIG. 1;

FIG. 3 is an end view of the structure shown in FIGS. 1 and 2 as viewed from the right-hand end;

FIG. 4 is a vertical sectional view taken substantially along the line 4—4 of FIG. 3;

FIG. 5 is a fragmentary side elevational view showing a modification of the invention;

FIG. 6 is an end view of the structure shown in FIG. 5 as viewed from the right-hand end;

FIG. 7 is a top plan view of the structure shown in FIG. 5;

FIG. 8 is a fragmentary side elevational view of another embodiment of the invention;

FIG. 9 is a top plan view of the structure shown in FIG. 8; and

FIG. 10 is a fragmentary side elevational view of still another embodiment of the invention.

Referring first to FIGS. 1–4, the invention is illustrated in connection with a slide rail conveying and sorting system of the type which might be used in a dry cleaning plant for conveying garments on clothes hangers. The system has an elongated main rail structure 20 which in this instance is made up of a pair of parallel twin rail elements 21 and 21' held in rigidly spaced relation by suitable spacing means (not shown). Conventional garment hangers having hook portions 22 are moved along the main rail structure 20 by means of the usual inverted U-shaped pusher forks mounted on an endless chain or belt and disposed above the main rail structure 20 of the conveyor. In FIG. 1, the lower ends of the pusher fork legs are shown at 23, and it will be seen that the legs 23 are disposed closely adjacent the outer sides of the rail elements 21 and 21' for engaging a hanger hook 22 and thereby pushing the hanger along the main rail structure 20 in the direction indicated by the arrows on the pusher fork legs 23.

An inclined gap 24 is formed in the main rail structure 20 to provide a discharge station at which hangers moving along the main rail structure may drop through the gap 24 and thence be diverted to one or the other of a pair of laterally extending branch rails or receiving rods 26 and 27 by means of the selective switch means constituting the subject matter of the present invention. The branch rails 26 and 27 each have a terminus spaced from the main rail structure 20 so that a bridging switch is necessary to connect the main rail structure to the branch rails. In this embodiment of the invention, the main rail structure 20 is provided with a slidable switch 28 which, when in closed position, bridges the gap 24 in the main rail structure. The main rail switch 28 also functions in this embodiment of the invention as the actuating means for the selective two-way switch, as hereinafter described.

The switch 28 comprises an elongated one-piece strip disposed between the twin rail elements 21 and 21' and having a lowermost horizontal portion 29 which is rigidly affixed by screws 32 to the rectangular open frame portion 31 of a reciprocable slide 30. The switch 28 also comprises an upper horizontal portion 33 having its upper surface in substantial alignment with the uppermost edges of the twin rail elements 21 and 21'. The switch portions 29 and 33 are integrally connected by an upright central portion 34. The main rail structure 20 may be supported from a ceiling or other superstructure by means of suitable brackets one of which is shown at 36. The bracket 36 has a horizontal extending leg portion 37 which, in this instance, has affixed to its outer end a switch mounting block 38 which extends upwardly between the twin rail elements 21 and 21' and is rigidly secured thereto, as by a plurality of screws 39. The block 38 is provided with a horizontal bore 41 parallel to the axis of the main rail structure 20, and a tubular slide shaft 42 has one end thereof rigidly secured in the bore 41. The frame 31 of the slide 30 has rigidly mounted therein a tubular bushing 43 through which the tubular slide shaft 42 extends. Thus, it will be seen that the main rail switch 28 is slidably supported on the slide shaft 42 for longitudinal sliding movement between the twin rail elements 21 and 21'.

Movement of the main rail switch 28 is accomplished, in this embodiment of the invention, by means of an angular operating arm 44 having an upright arm portion 46 and a horizontally extending arm portion 47. The arm portion 46 is connected at its upper end to a longitudinally shiftable operating rod 48. Preferably, the arm portion 46 and the rod 48 are adjustably connected, as by means of a loop portion 49 at the upper end of the arm portion 46 and a screw 51, so that the position of the operating arm 44 on the rod 48 can be adjusted when necessary to accommodate the position of the switch mechanism at the main rail.

The operating rod 48 is slidably supported in a bushing 52 affixed to the bracket 36. The arm portion 47 extends into the open frame 31 of the slide 30 beneath the bushing 43. The outermost end of the arm portion 47 is preferably formed with a pair of oppositely extending lateral projections 53 and a depending central projection 54 so as to provide a three-point operating contact with the inner surfaces of the slide frame 31 but without being fastened to the frame. Thus, as best seen in FIG. 4, the lateral projections 53 have close fitting contact with the oppositely disposed vertical sides of the slide frame 31, and the central depending projection 54 engages the bottom wall of the slide frame 31. By this arrangement, the arm portion 47 is detachably but operatively engaged with the slide frame 31, and the depending projection 54 serves to elevate and position the lateral projections 53 closely adjacent the bushing 43, thereby minimizing any tendency toward cocking and binding of the slide bushing 43 during movement of the slide 30 along the slide shaft 42.

An elongated pivot shaft or rock shaft 56 is rotatably supported in the bore of the tubular slide shaft 42 and has a stop collar 57 affixed to one end portion, as by a set screw 58, and another stop collar 59 affixed to its opposite end, as by a set screw 61. The stop collar 57 abuts one end of the block 38, and the stop collar 59 abuts the outermost end of the slide shaft 42, thereby preventing longitudinal movement of the shaft 56 while permitting rotary movement of the same relative to the slide shaft 42.

Shifting of the main rail switch 28 is effected by longitudinal shifting movement of the operating rod 48 carrying the operating arm 44 which in turn engages the interior of the slide frame 31, as previously described, for moving the slide 30 and the switch 28 along the slide shaft 42. Any conventional means (not shown), such as a fluid actuated cylinder or a solenoid, may be employed to shift the operating rod 48 in one direction relative to its supporting bushing 52, and a spring return indicated schematically at 62 is provided for shifting the operating rod 48 in the opposite direction relative to the supporting bushing 52. It will be understood that any desired number of discharge gaps 24 and switch mechanisms 28 may be provided at selected locations along the main rail structure 20, and all of the switches may be actuated simultaneously by means of a plurality of operating arms 44 affixed to a common operating rod 48. If desired, however, each switch mechanism may be actuated by a separately energized operating rod and attached arm.

The rock shaft 56 projects beyond the stop collar 57 and has rigidly affixed thereto a tubular support 63 with a bore 64 for receiving a bridging switch element. In this embodiment of the invention, the axis of the bore 64 is disposed at right angles to the axis of the rock shaft 56. The bridging switch element is designated generally at 66 and comprises a unitary length of substantially rigid wire or rod-like material having a pivot portion or leg 67 loosely received in the bore 64 and a bridging portion or leg 68 extending at right angles to the pivot portion 67. At the upper end of the tubular switch support 63, the outer wall portion is cut away through approximately 180° to provide a semi-circular shoulder or ledge 69 and a pair of upright abutment surfaces 71 and 72 at the opposite ends of the arcuate ledge 69. The bridging leg 68 of the switch 66 rests on the shoulder 69 and is freely swingable in an arcuate path between the abutments 71 and 72, as described below. The lowermost end of the pivot leg 67 projects below the tubular switch support 63 and has a retainer 73 detachably connected thereto by a set screw 74.

A torsion spring 76 surrounds the rock shaft 56 and is disposed within an axial recess or counterbore 77 in the stop collar 57. One end of the spring 76 is anchored in a groove 78 in the block 38, and the opposite end of the spring 76 is received in a groove 79 in the stop collar 57. Thus, the rock shaft 56 is spring loaded by means of the torsion spring 76 for urging the shaft 56 in a counterclockwise direction as viewed in FIG. 3. A radially projecting stop pin 81 extends from the upper side of the stop collar 57 and engages the inner surface of the rail element 21' for limiting the rotary position of the shaft 82 may be provided in the stop collar 57 so that the 56 in the counterclockwise direction. An additional groove tension of the torsion spring 76 may be adjusted by inserting the movable end of the spring in either the groove 79 or the groove 82, as desired.

The outermost end of the main rail switch portion 29 is formed with an angular cam edge 83 which is adapted to engage a radially extending cam pin 84 projecting upwardly from the stop collar 59. Thus, when the cam edge 83 is moved against the cam pin 84, the rock shaft 56 is rotated in the clockwise direction, as viewed in FIG. 3, until the stop pin 81 engages the inside of the rail element 21, thereby limiting rotary movement of the shaft 56 in the clockwise direction. As will be apparent, the length of the stop pin 81 can be selected so as to obtain the desired range of tilting movement of the shaft 56 and the switch support 63. Likewise, the set screw adjustment of the collar 59 on the shaft 56 permits positioning of the cam pin 84 in relation to the angular cam edge 83 so as to obtain the desired degree of rotation of the shaft 56 by shifting of the switch 28.

In operation, the main rail switch 28 has three positions: (1) a closed position in which a hanger may be transported across the gap 24 without being discharged, (2) a first open position in which a hanger may be discharged from the main rail onto the branch rail 26 at one side of the main rail structure, and (3) a second open position in which a hanger may be discharged through the gap 24 onto the branch rail 27 at the opposite side of the main rail structure. The closed position of the main rail switch 28 is shown in full lines in FIGS. 1 and 4 and in broken lines in FIG. 2. In this position of the mechanism, the operating rod 48 is maintained in its extreme right-hand position by the return spring 62, the switch portion 34 and the slide frame 31 abut the opposing edge of the block 38, and the switch portion 33 extends across the gap 24 with its free outermost end being supported on a cross pin 86 extending rigidly between the twin rails 21 and 21' at the downstream side of the gap 24. At the same time, the spring loaded rock shaft 56 is maintained in its extreme counterclockwise position (as viewed in FIG. 3) so that the bridging switch support 63 is inclined or tilted in the direction shown in FIG. 3. Since the pivot leg 67 of the bridging switch 66 is freely rotatable in the bore 64, the bridging leg 68 is held by gravity against the abutment 72, in which position the bridging leg 68 overlies the branch rail 26, preferably in aligned but slightly spaced relation above the rail 26. As a hanger is moved along the main rail structure 20 by the pusher fork legs 23, the hanger slides across the gap 24 while supported on the switch portion 33, and the upright or closed side of the hanger hook 22 engages the bridging leg 68 causing the latter to be lifted upwardly toward the rail structure 20 and thereby permitting unobstructed movement of the hanger beyond the discharge station. Once the hanger has cleared the discharge juncture, the bridging leg 68 returns by gravity to its position of alignment with the branch rail 26 because of the inclined or tilted position of the switch support 63 and the loose pivotal mounting of the leg 67 therein.

If it is desired to discharge a hanger from the main rail structure 20 onto the branch rail 26, the operating rod 48 is energized and moved in the direction indicated by the arrow so that the slide 30 and the rail switch 28 mounted thereon are shifted to an intermediate position indicated by broken lines in FIG. 1 and by full lines in FIG. 2. In this position of the switch mechanism, the switch portion 33 is retracted sufficiently to clear the gap 24, but the angular cam edge 83 does not actuate the cam pin 84. Since the spring loaded rock shaft 56 is still maintained in its FIG. 3 position, the bridging leg 68 of the bridging switch 66 remains in aligned operative relation with the branch rail 26 so that a hanger moving along the main rail structure 20 drops through the open gap 24 and slides along the inclined bridging leg 68 onto the branch rail 26 where it may be stored, removed manually, or conveyed to a remote location.

If it is desired to discharge a hanger from the main rail onto the opposite branch rail 27, the operating rod 48 is moved further in the direction of the arrow to its extreme position, thereby moving the slide 30 outwardly along the slide shaft 42 until the slide 30 abuts the stop collar 59. The cam edge 83 on the rail switch portion 29 thereby engages the cam pin 84 and continued movement of the switch portion 29 to its extreme position (indicated by dot-dash lines in FIGS. 1 and 2) causes rotary movement of the rock shaft 56 in a clockwise direction as viewed in FIG. 3, thereby tilting the bridging switch support 63 in the opposite direction, as seen in broken lines in FIG. 3, against the action of the torsion spring 76. Because of the free pivotal mounting of the switch leg 67 in the bore 64, the bridging arm 68 swings freely by gravity to its opposite position against the abutment 71 and thereby moves into operative alignment with the branch rail 27. A hanger moving along the main rail structure 20 then drops through the open gap 24 onto the inclined bridging leg 68 and thence onto the branch rail 27. When the operating rod 48 is deenergized, the return spring 62 causes the main rail switch 28 to return from either of its above-described open positions to its closed position spanning the gap 24. At the same time, when the cam edge 83 is disengaged from the cam pin 84, the torsion spring 76 causes the rock shaft 56 to return the bridging switch support 63 to its FIG. 3 full line position wherein the bridging leg 68 is in operative alignment with the branch rail 26.

In the embodiment of FIGS. 1–4 just described, the bridging switch 66 is freely pivotable in the switch support 63 so that the bridging leg 68 swings by gravity from one side of the main rail structure to the other side in response to rotations of the rock shaft 56 between its extreme positions. However, it will be recognized that with such an arrangement the bridging leg 68 is always in outwardly projecting position in operative alignment with one or the other of the branch rails 26 or 27 regardless of whether the main rail switch 28 is closed or is in either of its open positions. Consequently, it is not possible to move hangers across the gap 24 in a reverse direction, if such is desired, since such movement would be obstructed by the outwardly projecting bridging leg 68 which is limited in the extent of pivotal movement by the abutments 71 or 72.

In FIGS. 5–7, a modified form of the invention is shown which permits reverse movement of hangers along the main rail structure where such is desired. The portions of the structure in FIGS. 5–7 which are the same as those shown in FIGS. 1–4 are designated by the same reference numerals.

In this embodiment of the invention, a tubular bridging switch support 91 having a bore 92 is rigidly affixed to the rock shaft 56 with the tubular axis of the support 91 in inclined or non-perpendicular relation to the axis of the horizontal rock shaft. As seen in FIG. 5, the upper end of the switch support 91 has an angle of less than 90° with respect to the rock shaft axis, and the lower end of the switch support 91 is disposed at an angle greater than 90° with respect to the rock shaft axis. In addition, a portion of the tubular wall at the upper end of the support 91 is cut away so as to provide an arcuate shoulder or ledge 90 having a centrally located low point or depression 93 with the shoulder curving upwardly at each side of the low point 93. The opposite ends of the arcuate shoulder 90 terminate in upright abutment portions 94 and 96 in a manner similar to the previously described embodiment.

The bridging switch element, designated generally at 97, has a depending pivot leg 98 rotatably received in the bore 92 and a bridging leg 99 extending horizontally below the main rail structure 20 and at an angle of less than 90° with respect to the leg 98. As before, the outwardly extending bridging leg 99 rests on the shoulder 90, but in this case a spring mounting is provided so that the bridging leg 99 is normally seated in the low point 93 of the shoulder 90 for normally retaining the leg 99 centrally of the shoulder 90 regardless of the rotary position of the shaft 56. Thus, the lower end of the leg 98 projects below the tubular support 91 and has a retaining washer 100 affixed thereto, as by a cotter pin 101. A compression spring 102 surrounds the lower projecting end of the leg 98 and coacts between the washer 100 and the lower axial end of the tubular support 91, thereby normally urging the bridging switch 97 downwardly in the support 91. By this arrangement, the bridging leg 99 is resiliently retained in engagement with the low point 93 of the shoulder 90, but the leg 99 can be pivoted to either side of the support 91 against the abutments 94 or 96 by a force sufficient to overcome the effect of the spring 102.

As best seen in FIGS. 6 and 7, the spring-loaded rock shaft 56 is normally retained in its counterclockwise position, but the bridging leg 99 of the bridging switch 97 remains seated in the depression 93 by the action of the spring 102 so that the leg 99 is retained between the confines of the twin rails 21 and 21' in spite of the tilted position of the support 91. However, if the main rail switch 28 is in its first open position for discharging hangers to the branch rail 26, it will be seen that a hanger will drop through the gap 24 onto the bridging arm 99 and the weight of the hanger and the garment thereon will force the leg 98 to rotate in its inclined support in the direction of the branch rail 26, thereby allowing the hanger to be discharged onto the branch rail 26 as shown in broken lines in FIGS. 6 and 7. Once the hanger clears the bridging arm 99, the action of the spring 102 will cause the arm 99 to be returned to its central position in seated relation in the depression 93. Similarly, when the main rail switch 28 is in its other open position, the spring-loaded rock shaft 56 will be cammed to its opposite or clockwise position, as viewed in FIG. 6, and a hanger dropping through the gap 24 onto the bridging leg 99 will cause the latter to swing in the opposite direction into alignment with the branch rail 27. Once the hanger has cleared the bridging leg 99, the latter will be restored to its central position relative to the support 91 by the action of the spring 102. The abutments 94 and 96 limit the extreme pivotal movement of the switch leg 99, and the bridging leg 99 is always retained in a centrally disposed position relative to its support 91 and within the confines of the rails 21 and 21′ except during the brief interval of transfer of a hanger to one of the branch rails. Consequently, it will be seen that the conveyor system can be operated in reverse fashion to move a hanger 22 in the opposite direction across the gap 24 without being obstructed by the branch rail bridging switch. If the gap 24 is open during reverse operation of the conveyor, hangers can be discharged onto the branch rails in the manner already described.

In the above-described embodiments of the invention, rotation of the rock shaft 56 to position the branch rail switch in either of its two bridging positions is accomplished in response to and in unison with actuation of the main rail switch 28 through the operating rod 48 and its energizing means. However, it should be understood that the invention is not limited to any specific arrangement for effecting pivotal movement of the rock shaft 56 and such actuation can be accomplished by any desired mechanical or electrical means which may be controlled either manually or automatically. Furthermore, the actuating means for effecting rotation of the rock shaft 56 and thereby positioning the branch rail switch may be totally independent of the rest of the system or it may be operatively interconnected with some other portion of the system.

As a further illustration of the scope and flexibility of the invention is this respect, I have shown in FIGS. 8 and 9 a modification of the invention wherein rotation of the rock shaft 56 is effected by the action of the conveyor forks which push the hangers along the main rail structure. Thus, in FIGS. 8 and 9 a hanger hook portion 106 is shown in the process of being pushed along a main rail structure comprising parallel twin rails 107 and 108 by means of an inverted U-shaped pusher fork, the lower leg portions of which are designated at 109 and 111. The leg 109 has a depending projection or lug 112. A switch mounting block 113 is mounted at the outer end of a supporting bracket leg 114, as in the previously described embodiments, and the block 113 extends upwardly between and is secured to the twin rails 107 and 108. A rock shaft 116, which is similar to the rock shaft 56 in the previously described embodiments, is journaled in a bore 117 in the block 113. The left-hand end of the rock shaft 116, as viewed in FIGS. 8 and 9, projects from the block 113 through a tubular spacer or bushing 118 and has secured to its outer end a collar 119 having an upwardly radially projecting cam pin 121 similar to the collar 59 and the cam pin 84 of the previous embodiments. Although not shown in the drawing, it will be understood that the right-hand end of the rock shaft 116 carries a tubular switch support and a bridging switch element such as shown at 63 and 66 in FIGS. 1–4 or at 91 and 97 in FIGS. 5–7. However, the rock shaft 116 is not spring loaded.

For coaction with the cam pin 121, a cam element 122 is pivotally mounted beneath the main rail structure by means of a cap screw 123 extending upwardly through an opening in the cam element 122 and threaded into a mounting block 124 which is rigidly mounted between the rail elements 107 and 108. A helical compression spring 126 surrounds the screw 123 and is interposed between the block 124 and the cam element 122 so that the latter will be retained in a given pivotal position by frictional pressure against the head of the cap screw 123.

The cam pin 121 is received in an elongated slot 127 provided in the cam element 122, and it will be seen that as the cam element 122 is pivoted in a horizontal plane about the axis of the cap screw 123 from one side of the main rail structure to the other, the rock shaft 116 will also be pivoted about its axis for positioning the branch rail switch in either of its two bridging positions, as desired.

As best seen in FIG. 9, actuation of the pivotal cam element 122 is accomplished by means of depending projections from the moving conveyor forks. Thus, in FIG. 9 the conveyor fork is shown after having moved the hanger hook 106 from left to right along the twin rails 107–108 beyond the cam element 122. The position of the cam element 122 and the cam pin 121 shown in dotted lines is the position prior to the arrival of the fork and hanger at the cam location. The cam element 122 is provided at its sides with a pair of angularly extending diverging cam edges 128 and 129, and as the fork moves toward the cam element, it will be seen that the cam edge 128 is directly in the path of the depending projection 112 on the fork leg 109. As the fork moves along, the projection 112 engages the angular cam edge 128 and the cam element 122 is thereby pivoted in a clockwise direction to the solid line position shown in FIG. 9. It will be understood that the absence of any depending projection or lug from the fork leg 111 and the enlarged dimensions of the hanger hook portion 106 provide sufficient clearance to permit the aforementioned pivotal movement of the cam element 122.

When the hanger hook 106 arrives at the main rail gap, the hanger will be dispersed via the branch rail switch onto the branch rail corresponding to the position of the cam element 122. The branch rail switch will remain in this position until a subsequent fork (not shown) having a depending projection from the fork leg 111 arrives at the cam location. When this occurs, the projection on the fork leg 111 will engage the angular cam edge 129 and thereby shift the cam element 122 to its opposite or dotted line position, as shown in FIG. 9, thereby rotating the rock shaft 116 in the opposite direction so that the next hanger will be discharged through the main rail gap to the opposite branch rail. The cam element 122 also has oppositely disposed angular cam edges 131 and 132 for coaction with the conveyor forks during reverse operation of the conveyor system, it being understood that in such reverse operation the cam element 122 will be actuated by one fork to control the dispersion of the hanger being pushed by the next succeeding fork.

In FIG. 10, further modifications of the invention are shown comprising different spring loading arrangements for the rock shaft and the bridging switch and a different location for the bridging switch so that it can also function as a main rail switch.

Thus, in FIG. 10 a main rail structure is designated at 136 and comprises spaced twin rail elements 137 only one of which is seen in the drawing. A mounting block 138 is supported at the outer end of a bracket leg 139 and projects upwardly between the spaced rail elements 137 and is secured thereto by screws 140. A pair of spaced upper extensions 142 project longitudinally from the upper edges of the twin rail elements into a main rail gap 141, only one of the extensions 142 being visible in FIG. 10. A pair of spaced lower extensions 143 also project to a lesser extent into the gap 141 from the lower edges of the twin rail elements, and again only one of the extensions 143 is seen in the drawing.

A rock shaft 144 is journaled in a bushing 146 carried by the block 138, and a stop collar 147 is adjustably affixed adjacent the left-hand end of the shaft 144 by a set screw 148, the collar 147 being disposed beyond the terminus of the rail structure 136 at the gap 141 and between the upper and lower rail extensions 142 and 143. Although not shown in FIG. 10, the right-hand end of the rock shaft 144 is provided with a cam pin and pivotal cam element arrangement similar to that shown in FIGS. 8 and 9 so that the shaft 144 is adapted to be rocked in either direction by suitable conveyor fork extensions. Other suitable means for effecting rotation of the shaft 144 may also be used. Beyond the stop collar 147, a tubular switch support 149 is rigidly carried on the rock shaft 144. A bridging switch 151 has a depending pivot leg 152 rotatably received in an axial bore 153 in the support 149 and also has a bridging leg 154 extending at right angles to the leg 152. The upper end of the tubular support 149 has an arcuate shoulder 156 with a center groove or depression 157. A stop collar 158 is secured by a set screw 159 to the projecting lower end of the leg 152 in slightly spaced relation below the lower axial end of the support 149.

The bridging leg 154 of the switch 151 rests on the shoulder 156, and when the shaft 144 is in its center position relative to the main rail structure 136 and the bridging leg 154 is in its center position in the groove 157, as hereinafter described, it will be seen that the bridging leg 154 will be disposed in alignment with the main rail structure 136 slightly below the upper edges of the upper rail extensions 142. Thus, the bridging leg 154 when in normally centered position extends across the gap 141 in the main rail structure and overlies a receiving plug 162 at the downstream side of the gap 141. The plug 162 has an end portion 163 of square or rectangular cross-section which is rigidly mounted between a pair of twin rail elements 164. The plug 162 also has an opposite end portion 166 of round cross-section which projects into the gap 141 beneath the bridging leg 154. A hanger moving along the main rail structure 136 toward the gap 141 is transported along the upper rail extensions 142, thereby passing over the switch support 149, and then moves onto the switch leg 154 which is in its central bridging position and thence onto the receiving plug 162 and the rail elements 164.

A spring mounting is provided for the bridging switch 151 for normally centering the same in its support 149. Thus, the lower extremity of the pivot leg 152 has a laterally extending lug or connector 167 rigidly connected thereto by a pin 168, and the outer end of the lug 167 is connected by a tension spring 169 to the lower end of a radial stop pin 171 which depends rigidly from the stop collar 147 in between the lower main rail extensions 143. The pin 171 extends parallel to the bridging switch pivot leg 152 and moves in unison therewith during rotation of the rock shaft 144. The spring 169 exerts a sufficient downward force on the leg 152 through the lug 167 to retain the leg 154 in normal seated relation in the shoulder groove 157, thereby normally centering the bridging leg 154 relative to its support 149. At the same time the connection of the spring 169 to the outer end of the lug 167 in offset relation to the axis of the pivot leg 152 provides a resilient torque which resists rotation of the pivot leg 152 in the bore 153.

Consequently, when the switch support 149 is tilted toward one or the other of the branch rails (not shown) in response to rotation of the rock shaft 144, the bridging leg 154 remains seated in the groove 157 until the weight of a hanger deposited onto the bridging leg 154 forces the bridging switch to pivot in its support 149. The bridging leg 154 is thereby displaced from its centering groove 157 onto the shoulder 156 with a slight lifting of the pivot leg 152 in the bore 153 as permitted by the spaced collar 158. As the leg 152 rotates in the bore 153, the eccentrically connected spring 169 is placed under increased tension, and when the hanger has cleared the bridging arm 154, the tensioned spring 169 causes reverse rotation of the pivot leg 152 followed by slight downward or axial displacement of the leg 152 as the leg 154 is restored to its normally centered position in the groove 157. The initial tension of the spring 169 is adjustable by regulating the axial position of the collar 147 on the rock shaft 144.

As seen in FIG. 10, the upper end of the tubular support 149 extends upwardly to a slight extent between the upper rail extensions 142, but the spacing between the extensions is sufficient to allow the support 149 to clear the lower edges of the extensions in either direction of tilt so as to permit free pivotal action of the bridging switch under the influence of a hanger deposited thereon. The rounded contour of the outer plug portion 166 also provides sufficient clearance to accommodate arcuate movement of the outer overlying end of the bridging leg 154 as the switch support 149 is tilted.

The shaft 144 is also spring loaded for normally retaining the shaft in a central position. Instead of a torsion spring which urges the rock shaft to an extreme rotary position, as in the case of spring 76 in FIGS. 1–4, the present embodiment utilizes a tension spring 172 coacting vertically between the pin 171 and a centrally disposed anchor pin 173 projecting horizontally from the bracket arm 139. As the rock shaft 144 is rotated in either direction, the upper end of the spring 172 is displaced, thereby placing the spring 172 in an inclined position and also increasing the spring tension. The pin 171 extends downwardly between the lower rail extensions 143, thereby limiting the extent of rotary movement of the shaft 144 in each direction as the pin 171 abuts the rail extensions. The latter can be bent inwardly or outwardly to regulate the extent of rotary movement of the shaft 144.

In order to effect discharge of a hanger from the main rail to a branch rail, suitable means must be provided for temporarily retaining the rock shaft 144 in its rotated position against the restoring action of the spring 172. For example, when rotation of the shaft 144 is effected by means of conveyor fork extensions acting on a cam means, as previously described, the spacing of successive forks may be coordinated so that when a preceding fork, as shown at 174 in FIG. 10, has moved a hanger 176 onto the bridging leg 154 of the bridging switch 151, a succeeding fork (not shown) will arrive at and actuate the pivotal cam for rotating the shaft 144 in the desired direction to discharge the hanger 176 onto the desired branch rail. Once the hanger 176 has cleared the bridging switch 151 and the succeeding actuating fork has cleared the cam mechanism, the tensioned spring 172 restores the shaft 144 to its central rotary position. Any other suitable means may also be used for insuring retention of the shaft 144 in the desired rotary position until the hanger has been discharged to a branch rail. For example, the cam means for rotating the shaft 144 may be positioned as close as possible to the switch support 149, and conveyor forks having extended actuating portions may be used so that the same fork that pushes a hanger onto the bridging switch also retains the cam mechanism in actuated position until the fork has been discharged.

Thus, in the FIG. 10 embodiment, the switch 151 functions selectively either as a main rail switch for transporting hangers across the main rail gap 141 beyond the branch rail juncture or as a two-way branch rail switch for diverting hangers to one branch rail or the other at opposite sides of the main rail.

The invention has been described herein in connection with a system utilizing a main rail with gaps and main rail switches at predetermined locations such that a main rail switch must be opened before a hanger can be discharged through a gap onto one or the other of a pair of branch rails extending from opposite sides of the main rail. However, the principles of my present invention are also applicable to a strip type system which does not utilize main rail switches, e.g. as illustrated in my prior Patent No. 2,998,136, issued Aug. 29, 1961.

Although the invention has been illustrated and described in connection with certain specific structural embodiments, it will be understood that various modifications and alternatives may be resorted to without departing from the scope of the invention as defined in the appended claims.

I claim:

1. In a conveyor system of the class described, the combination of an elongated main rail having a gap therein, a pair of branch rails extending outwardly from opposite sides of said main rail and each having a terminus spaced from said main rail adjacent said gap, switch means at said main rail comprising a switch support tiltably mounted adjacent said gap and a switch element pivotally disposed in said support, and actuating means for effecting limited tilting movement of said support between oppositely inclined positions, said switch element being pivotally movable in said oppositely inclined positions of said support for bridging the space between said main rail and the terminus of one or the other of said branch rails whereby to effect selective diversion of an article onto one or the other of said branch rails after the article has been discharged from said main rail onto said switch element.

2. The combination of claim 1 further characterized in that said switch element has a loose pivotal mounting in said switch support and is freely pivotable by gravity toward one or the other of said branch rails in response to tilting movement of said support between said oppositely inclined positions.

3. The combination of claim 1 further characterized by the provision of retaining means for yieldably retaining said switch element in normally centered position relative to said switch support, whereby said switch element is normally disposed within the confines of said main rail in either of the oppositely inclined positions of said switch support for permitting movement of articles in both directions along said main rail but said switch element is movable under the influence of an article deposited thereon into bridging relation with one or the other of said bridging rails.

4. The combination of claim 3 further characterized in that said retaining means comprises centrally located recess means in said switch support and spring means acting on said switch element for resiliently and yieldably retaining the same in said recess means.

5. The combination of claim 1 further characterized in that said actuating means comprises resilient means operatively coacting with said switch support for yieldably retaining the latter in one of said inclined positions and operating means for moving said switch support to its opposite inclined position.

6. The combination of claim 1 further characterized by the provision of resilient means operatively coacting with said switch support for normally retaining the latter in centered non-inclined position relative to said branch rails, said switch element being adapted to bridge the gap in said main rail when said switch support is in said centered position and said switch support being movable by said actuating means to either of said oppositely inclined positions at opposite sides of said centered position.

7. The combination of claim 1 further characterized in that said switch means comprises a rock shaft mounted parallel to said main rail for limited rotary movement about its axis between opposite rotary positions, said switch support being rigidly carried by said shaft adjacent said gap, said switch element being disposed in said switch support on a pivot axis disposed at an angle to the axis of said shaft, the pivot axis of said switch element being shiftable between opposite inclined positions corresponding to opposite rotary positions of said shaft, and said actuating means comprises means for effecting limited rotary movement of said shaft between said opposite rotary positions.

8. The combination of claim 7 further characterized by the provision of a main rail switch movably supported at said main rail for bridging said gap when said main rail switch is in closed position, said main rail switch being movable to first and second open positions, spring means cooperating with said rock shaft for yieldably urging said shaft to one of said rotary positions in both the closed and first open positions of said main rail switch, and cam means responsive to movement of said rail switch to its second open position for moving said rock shaft to the other of said rotary positions.

9. The combination of claim 7 further characterized by the provision of moving fork means for sliding articles along said main rail, and cam means coacting between said fork means and said rock shaft for effecting movement of the latter between said opposite rotary positions.

10. The combination of claim 7 further characterized by the provision of spring means operatively coacting with said rock shaft for yieldably retaining the same in normally centered position intermediate said opposite rotary positions, said switch support being disposed so that said switch element bridges said gap in said main rail when said rock shaft is in said centered position, and said actuating means comprises operating means for rotating said shaft to either of said rotary positions.

11. In a conveyor system wherein articles are moved along a main path and are diverted to one or the other of a pair of branch paths extending outwardly from opposite sides of said main path, an improved diverter means comprising a support tiltably mounted relative to said main path, an article carrying element pivotally disposed about a first axis in said support, and actuating means for effecting limited tilting movement of said support about a second axis transverse to said first axis between oppositely inclined positions, said article carrying element being pivotally movable in said oppositely inclined positions of said support toward one or the other of said branch paths for selectively diverting an article from said element to one or the other of said branch paths.

References Cited

UNITED STATES PATENTS

| 951,740 | 3/1910 | McCracken | 193—31 |
| 3,124,236 | 3/1964 | Gerisch | 198—169 |
| 3,282,400 | 11/1966 | Jonson | 198—38 |

FOREIGN PATENTS 946,517   8/1956   Germany.

EVON C. BLUNK, Primary Examiner.

R. J. HICKEY, Assistant Examiner.

U.S. DEPARTMENT OF COMMERCE

PATENT OFFICE

Washington, D.C. 20231

UNITED STATES PATENT OFFICE

CERTIFICATE OF CORRECTION

Patent No. 3,403,767            October 1, 1968

Rudolph F. Gerisch

It is certified that error appears in the above identified patent and that said Letters Patent are hereby corrected as shown below:

Column 3, line 13, "horizontal" should read -- horizontally --. Column 4, lines 41 and 42, "82 may be provided in the stop collar 57 so that the 56 in the counterclockwise direction. An additional groove" should read -- 56 in the counterclockwise direction. An additional groove 82 may be provided in the stop collar 57 so that the --. Column 11, line 37, "bridging" should read -- branch --. Column 12, line 18, after "said" insert -- main --.

Signed and sealed this 24th day of February 1970.

(SEAL)

Attest:

Edward M. Fletcher, Jr.

Attesting Officer

WILLIAM E. SCHUYLER, JR.

Commissioner of Patents